Patented Dec. 8, 1942

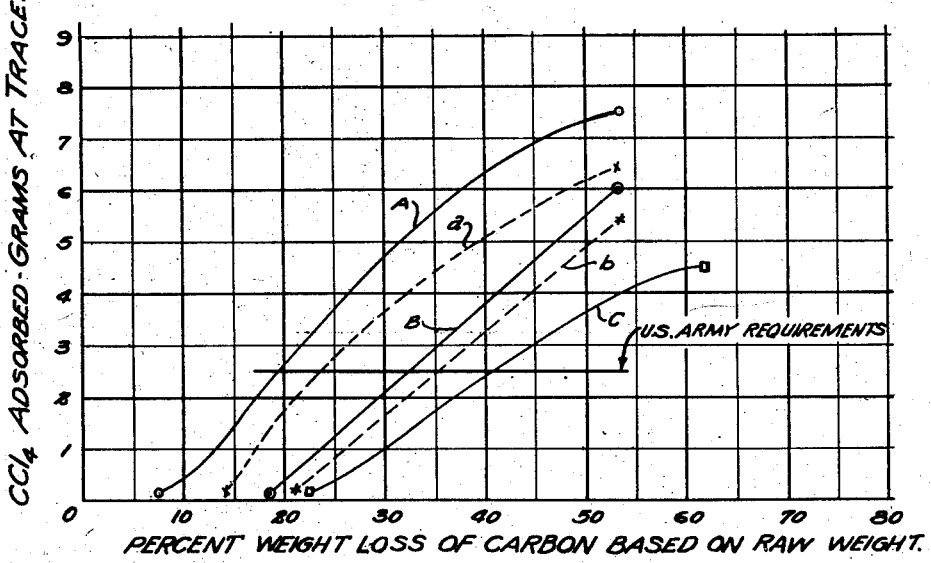
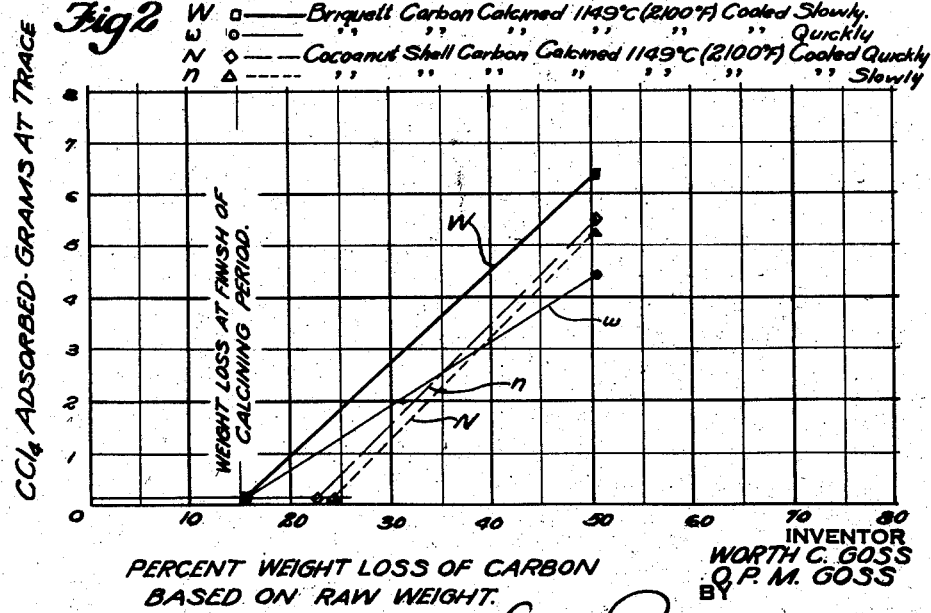

2,304,351

UNITED STATES PATENT OFFICE 2,304,351

METHOD OF MANUFACTURING PRIMARY CARBON

Worth C. Goss and Oliver P. M. Goss, Seattle, Wash., assignors to William A. Carlisle, Sr., Seattle, Wash.

Application June 18, 1938, Serial No. 214,534

4 Claims. (Cl. 202—9)

This invention relates to a method of manufacturing "primary carbon" and it has reference more particularly to a method for the making of primary carbon from soft porous wood, such as Douglas fir, to provide a product that is especially desirable for use as a starting material for the manufacture of gas mask carbon; that is, a gas and vapor adsorptive carbon of granular form for use in gas masks, adsorptive towers, for air purification and for many other uses.

It is the principal object of this invention to provide a practical method for the commercial production, from wood of the above kind, or from other woods or carbonaceous material, of an extremely dense primary carbon of flinty hardness, without gross pores and characterized by having a complete interlacing of molecularly dimensioned interstices whereby the product is rendered unusually easy to activate and exceedingly adsorbent upon being activated.

It is also an object of the invention to provide a method of treatment whereby the potential adsorptive quality of carbon derived from other sources, such as cocoanut shells, cohune nut shells, and the like, may be greatly improved.

It is a further object to provide a method that is an improvement upon the method as taught by Hawley in United States Patent No. 1,385,826, in that the primary carbon obtained by the present method is more easily activated, denser, and of still greater effectiveness in the adsorption of gas and vapor.

It will here be pointed out that, at the present time, the United States Army specifications as set forth in U. S. Army specification #97—52—12 with reference to primary carbon produced from cocoanut shells for gas mask use, require that when activation is complete, the cocoanut shell product shall have a chloropicrin test time of at least thirty-five minutes and a hardness number of 65. It has been demonstrated by numerous tests that, according to the present method, when 44% of the weight of the primary carbon made from soft wood has been lost through steam activation, the product has a chloropicrin test time of 110 minutes and a hardness number of 90, thus showing the production of a material that adsorbs over three times the chloropicrin required by U. S. Army specifications, and is 350% harder, as a hardness number of 90 means that only 10% of the carbon was crushed in a given shaking test while a hardness number of 65 means that 35% of carbon would be crushed in this same test.

Since it is recognized that the present method does, in some respects, follow previously known methods, in the description later to follow, those parts in which the present method differs from known methods will be particularly pointed out and commented on.

The present method, briefly stated, is as follows:

The material from which the carbon is to be formed and which may be in the form of fir sawdust or finely ground, chopped or comminuted cellulose materials, is dried, or otherwise brought to a definite condition of moisture content, then briquetted while hot, under a pressure of approximately 50,000 pounds per square inch.

Practical manufacture requires that the briquetting of material in this process be in vacuum and by impact, for the reason that it makes possible the production of briquettes that are exceedingly hard and of a block density of 1.15, or greater, which is exceedingly desirable.

The briquettes thus formed are then charred, by a process of destructive distillation, in a retort under a temperature of substantially 1000° F., and while retained under mechanical pressure of approximately 200 pounds per square inch of end surface. Aso, while confined in the presence of their distillate gases to an extent of about 35 pounds per square inch absolute.

Upon removal of the charred briquettes from the retort, they are cooled, then ground into granules of a size that will pass through a screen of six-meshes to the inch and retained by a screen of fourteen meshes to the inch. Granules of low specific gravity are separated from those of the desired, greater specific gravity by flotation, then the retained granulated material, while confined in a suitable crucible, is given a novel calcining treatment. This treatment, which is an important feature of this method, starts with a temperature of 1100° F., and when the product under this temperature ceases to evolve inflammable gas, the temperature is stepped up to 1200° F., then, when it again ceases to evolve inflammable gas, at this increased temperature, the temperature is again stepped up, to 1300° F., and so on until 2100° F. has been reached, at which temperature it is held constant for a period of one hour after gas ceases to be evolved. Then the crucible, while still in the furnace, is slowly cooled. The primary carbon thus produced is then ready for steam activation, which may be carried on in the usual way or any satisfactory way.

Explanatory to the present invention, I have provided the accompanying drawing wherein Fig.

1 is a graph showing comparative results obtained with different materials distilled in a pressure of their distillate gases, and under no pressure. The graph also shows the effect of the above described calcining treatment as contrasted with the commonly used calcining treatment that stops at 1500° F.

Fig. 2 is a graph showing a comparison between quickly cooled carbon and carbon which has been very slowly cooled.

It will be understood that briquettes may be made when the material is hot and dry or else when the material is comparatively cool and has a slight moisture content.

Now, describing more in detail the successive steps of the present method, assuming for the purpose of explanation that the material to be converted into charcoal is derived from Douglas fir: The material, in comminuted condition, would ordinarily, but not necessarily, be taken from the conveyor in a saw mill that leads to the waste burner. However, regardless of how or where it is obtained, it is desirable that the material first be brought to an even and definite moisture content. The most practical method of obtaining this condition, especially since the material is received in varying condition, all the way from dry to soggy wet, is to first completely dry all material, then rehydrate it to the desired moisture content of 7% to 10%. In some cases, it might only require reducing the material by drying to the desired condition, or simply the addition of moisture, but most generally, the variation in condition makes it more practical to completely dry and then rehydrate.

For the purpose of completely drying the material, we prefer to use an apparatus of the kind described in U. S. Patent No. 1,985,250, issued jointly to O. P. M. Goss and Worth C. Goss on December 25, 1934. The drying apparatus of this patent comprises a continuous, circuitous tube in which a blower is interposed as a means for creating and maintaining a cyclonic circulation of air in the tube and whereby the material delivered into the tube for drying is carried in suspension while being dried. A casing surrounds the tube throughout its length and forms an enclosing chamber in which high pressure superheated steam is contained to furnish the drying heat. Also, there is provision of means for an automatic exhaustion of that steam created in the drying tube during the drying operation and other means for an automatic ejection of the material when it is properly dried.

When the comminuted dried material is discharged from the drying apparatus, it is quite hot and in the form of impalpable dust and very small splinters, and it remains in this condition until briquetted, preferably while at a temperature of 350° to 375° F. If necessary, the material may be heated just prior to briquetting to bring it to this desired heat condition.

Rehydration and cooling may be effected in various ways, such for example, as by causing the material to be circulated in a container into which a specified amount of moisture is injected for each batch of material of specified weight. The container in this case could be much like the drying duct shown and illustrated in Patent No. 1,985,250, above mentioned, or as described and illustrated in our copending application, filed on January 9, 1935, under Serial No. 998.

For the briquetting of the moisture or heat conditioned material, we prefer to use a machine of that kind shown in U. S. Patent No. 2,128,241 issued to Worth C. Goss, which matured from an application filed on January 4, 1936, under Serial No. 57,546. The machine of this patent has an air-tight receiving hopper for the dried material which is maintained under vacuum so that all air is extracted from the material before it is briquetted. The machine also comprises a rotary carrier equipped with a plurality of briquette forming dies, also under vacuum, and which are successively presented to a die charging ram for filling them with vacuumized comminuted material, after which the charged dies are presented to rams which, by heavy impact, compress the charges of material into briquettes. Finally, the dies are successively registered with a reciprocating punch which ejects the formed briquettes from the machine.

The special advantages in the use of this particular briquetting machine reside in the fact that the dried material for forming the briquettes is maintained entirely free of air, making it possible for it to be compressed into unity by sudden impact blows delivered at a pressure of approximately 50,000 pounds per square inch, thus insuring the production of exceedingly hard briquettes in which the individual particles of wood have been crushed by the impact in a manner whereby their pore volume is materially reduced. This condition is apparent by reason of the fact that a formed briquette has a block density of approximately 1.15.

In the previously referred to Hawley patent, it is stated that the briquettes as formed therein, are of sawdust and made under a pressure of 50,000 pounds per square inch, but it is not taught or indicated by Hawley that the formation of the briquette is by impact or that it is made in vacuum. It has been conclusively shown in our experiments with impact presses that a satisfactory briquette cannot be made under such heavy impact except in vacuum, and when so made, a better carbon is produced therefrom by reason of the great initial compression and reduction of pore volume in the particles of material.

The briquettes thus formed are then charred by destructive distillation in a gas-tight retort and while under mechanical pressure, preferably of that kind illustrated in the copending application of Worth Goss, filed on June 18, 1938, under Serial No. 214,535, now Patent No. 2,276,649. The retort, as described in the above application, comprises a plurality of superimposed trays, each adapted to contain therein a layer of the briquettes in close relation. Each tray forms a closure for the next lower tray and each is supported by its base resting upon the briquettes contained in the next lower tray. A hydraulic jack is utilized to effect the application of an exceedingly high mechanical pressure downward upon a closure or cover for the top tray, and this pressure is transmitted through the superimposed trays to the briquettes of all other trays to the extent of approximately 200 pounds per square inch of end surface; this pressure being maintained during the carbonizing period. Carbonization is effected by placing the retort within a furnace having a temperature of 1000° F. and maintaining it there for a specified or required length of time.

The above distilling apparatus also provides for retaining the briquettes in their distillate gases during their carbonization for the reason that the distilling chambers formed by the trays are made gas-tight with a relief valve provided whereby to retain the pressure of distillate gases at approximately thirty-five pounds per square inch absolute. The result of this gas pressure surrounding each briquette is to cause a thorough impregnation of the charred briquettes with heavy hydrocarbons.

During the charring operation, the briquettes, by reason of being subjected to compressing mechanical pressure, are reduced to approximately one-third their original length, and, by reason of this compression, the pores of the particles of material are reduced in size accordingly.

The carbonized briquettes are held under the stated mechanical pressure and in this pressure of their distillate gases until gas ceases to be evolved, when, of course, the distilled gas pressure will drop to atmospheric pressure. The mechanical pressure is maintained, however, for at least two hours after charring is complete. This final pressure step causes a further densification of the char of 4% by volume over what would be obtained if the mechanical pressure were released when gas evolution stops.

It might be well to here explain that when cold moist briquettes are used, the initial, predetermined moisture content of each briquette, which might be the result of the rehydration of the comminuted material previously described, has the effect of causing a more solid char to form; this probably being due to the extreme compacting action which takes place incident to the application of heat and pressure in the briquette, just prior to the actual charring, and which is facilitated by reason of there being moisture in the briquette. The compacting action of the briquette in the retort prior to actual charring is at least 16% by reason of the rehydration of material prior to briquetting. This added moisture is entirely driven off before the briquette chars.

That part of the present method concerning the charring of the briquettes while confined in a predetermined pressure of distillate gases, is contrary to the teachings of Barnaby and Chaney in U. S. Patent No. 1,751,612 of March 25, 1930, who disclose and claim therein a process for cocoanut shells or other carbonaceous material, requiring that it be treated in a gradually increasing temperature and finally finished at a uniform, predetermined temperature ranging from 350° C. to 700° C. and that during this treatment, gases of distillation be rapidly removed. This is also contrary to the teachings of K. B. Stuart in U. S. Patent No. 2,055,755, that gas pressures produce inactive carbon.

Fig. 1 submitted herewith is a graph in which adsorption is plotted against per cent of weight loss of carbon from various materials distilled under no pressure of distillate gases and under a given pressure, showing the advantages gained by the latter method.

In the graph, the curve A is that which represents the adsorptive quality of the present briquette carbon distilled under a pressure of distillate gases of 35.7 pounds per square inch absolute, while the dash line curve a is the result of distilling the same at atmospheric pressure.

The curves B and b, likewise, represent the results obtained from cocoanut shell carbon distilled, respectively, in a pressure of 35.7 pounds per square inch absolute and at atmospheric pressure. The curve C represents the results of the present briquette carbon distilled under atmospheric pressure with 1500° F. calcining. Line D represents the U. S. Army requirements, converted from chloropicrin adsorption to carbon tetrachloride adsorption.

The carbonized briquettes, when removed from the retort, are cooled and granulated for heat treatment of the carbon. The granules used are those which pass a screen of six-meshes to the inch and are retained by a screen of fourteen meshes to the inch.

When the briquettes are carbonized, a certain portion of the resultant char is of low specific gravity, due chiefly to lack of mechanical pressure around the side portions of each briquette. This portion of the material is soft, friable and light, while the central end portion of the char is hard, strong and dense, showing a glass-like fracture when broken. It is desirable to sort out and discard all light char as it makes an inferior product, especially for gas mask carbon. This preferably is done by specific gravity separation in a sugar-water solution of 1.06 density. The granulated material is stirred into a vat of the solution and the light char may then be skimmed from the top of the vat and discarded or used for an inferior grade of adsorptive carbon. The heavy char which has a bright, shiny appearance, is recovered from the bottom of the vat, washed with water and dried.

Material of the desired specific gravity is then placed in a graphite and clay crucible with a tight-fitting lid provided with a small aperture for escape of gas. The crucible is placed in an oil fired furnace at a temperature of 1100° F. When the contents of the crucible cease to evolve inflammable gas through the aperture, then the temperature is raised to 1200° F. and again left until inflammable gas ceases to be evolved. Thus, step by step, the crucible is heated up to 2100° F. at which heat it is left constant for one hour after inflammable gas ceases to be evolved.

The crucible is then left in the furnace and cooled slowly. When cold, the weight of material will be found to be only 90% of its weight before calcining, and its volume will be found to have decreased to 79% of its original volume. Thus, the carbon is very much densified by the treatment. It has a bulk apparent density on eight to ten mesh material of .74 as compared with cocoanut shell carbon, prepared according to approved methods with a bulk apparent density of .66, and this difference can be accounted for largely by waste gross pore volume that is contained inside the cocoanut shell carbon granules.

This material is now what is known in the art as "primary carbon" and is ready for activation by a steam process which forms no part of the present invention and will not be described. However, this primary carbon is of superior quality by reason of certain conditions in its manufacture which will now be reviewed.

In view of previous teachings concerning the production of an inactive form of carbon at temperatures coinciding with those of the present method, as set forth by Chaney in U. S. Patent No. 1,497,544 we offer this explanation: Inactive carbon is not formed merely when char is raised in temperature to 2100° F.; it is formed, however, when char is heated to 2100° F. and then quickly cooled. The formation of "inactive" carbon which is so ably described by Chaney in the above mentioned patent, we find to be strictly accurate, but this poor result is obtained only when the char is raised to a high temperature and then chilled too quickly; as, for example, by its removal from a white hot furnace, even if it is enclosed in a crucible with a tight-fitting lid.

As differentiated from the above, when the char is heated slowly, as in our method, to 2100° F., and then allowed to remain in the tightly closed furnace after heat input stops, cooling is very gradual and should take at least twelve hours. This high heating and slow cooling in the furnace results in a primary carbon which is extremely hard and amazingly adsorbent when activated.

Comparative results are illustrated graphically in Fig. 2 of the drawing wherein the curve $w$ is that for a material quickly cooled, and curve $W$ is that obtained for a material slowly cooled as taught in this method. Samples W and $w$ were identical, consisting of briquette char passing an eight to ten mesh screen. The two samples were placed in a furnace side by side and calcined, as above described, to 2100° F. Sample $w$ was lifted out of the furnace while still white-hot and set on a fire brick to cool down to the surrounding atmospheric temperature. Sample W was left in the closed furnace and cooled very slowly to room temperature. This required fifteen hours. When steam activated in an identical manner, the comparative adsorption results of the samples are those shown in Fig. 2.

Fig. 2 also illustrates, by the curves N and $n$, the effect of the present treatment on cocoanut shell char; curve N being for slow cooled, and curve $n$ for quick cooled material.

In Fig. 2, curve W represents the properties of Douglas fir briquette carbon treated by our method, and curve N shows the properties of cocoanut shell carbon after having been treated in exactly the same way. These curves indicate that properly prepared fir briquette carbon is superior to cocoanut shell carbon.

The great increase in activity obtained in slow cooling of briquette char as compared to quick cooling of the same type of material, does not apply to all types of char. It does apply to a large class of materials, in particular, those which contain a considerable proportion of heavy tars. Cocoanut shell char is not one of the materials which is aided by slow cooling as illustrated in Fig. 2, curves N and $n$. Our experiments show that a greater densification of cocoanut shell char is obtained by quick cooling than by any other treatment. Thus, quick cooled cocoanut shell carbon actually exhibits a greater activity toward carbon tetra-chloride (curve $n$, Fig. 2) than the same material slow-cooled (curve N, Fig. 2). This result is probably obtained on nut char because of the extra densification occurring in the quick-cooled nut char. It is also true that high-temperature calcining is of minor importance in improving the activity of nut chars. Due to this fact, our method has comparatively little value when applied to some materials, but it achieves a new and revolutionary result when applied to materials containing heavy tars, particularly when these substances are dense. Some agglomerated materials fall in this class, such as lampblack bonded by tar under pressure. The hardness of these heavy tar containing materials is greatly increased by 2100° F. calcining as by our method. The hardening effect of 2100° F. calcining on cocoanut shell char is negligible. Our method thus vastly improves certain types of char both as regards hardness and adsorptivity; the best example of this being primary carbon produced from comminuted Douglas fir wood.

In the present method, the special calcining treatment entirely eliminates the need for a preliminary "differential oxidation" treatment during activation as described by Chaney U. S. Patent No. 1,497,544. This is due to the fact that the hydrocarbon content of our primary carbon is extremely low. The hydrogen content of our primary carbon which has been calcined at 2100° F. is .46%. The hydrogen content of the same kind of char calcined at 1500° F., as per Chaney's patent, is 1.02%.

The present method of making a hard granular adsorptive carbon easily achieves a result which is impossible according to the claims of all prior investigators on the subject, as in U. S. Patent No. 1,819,165 to Hass, who claims carbon which has a service period of 100 minutes with chloropicrin. Prior to his work, no claims are made for carbon with a service time for chloropicrin of over about seventy minutes. However, with the present method, a service time of 120 minutes is very easily achieved.

In addition to a great length of service time, the carbon is hard and still comparatively dense, having a bulk apparent density of .45. The carbon described by Hass has a bulk apparent density of less than .3, and is a great deal softer and more friable than the carbon made in accordance with this application. Thus, it may be readily understood that our method eliminates the necessity for using any of the standard hydrogen eliminating methods such as "differential oxidation," chlorination, or treatment with phosphous vapor. It is our discovery of a way to heat char to a very high temperature and yet avoid any tendency toward formation of "inactive" carbon that enables us to dispense with dangerous and costly chemicals. Our special calcining treatment at 2100° F. thus reduces the hydrogen content by 55% under old calcining methods.

The advantage resulting from rehydration of comminuted material to the stated predetermined moisture content or the bringing of it otherwise to the desired condition of moisture resides in the fact that with that amount of contained moisture, a great plasticity of the briquette, just before charring, is obtained, permitting, under pressure and heat applied, a further densification of the briquette.

The advantages resultant to forming the briquette in vacuum are accounted for by the fact that if air is contained in the comminuted material, or trapped in the forming dies, it acts as a cushioning medium which prevents the formation of a solid, dense briquette, and also this air trapped under high compression tends to expand and disrupt the briquette when it is discharged from the die.

The formation of the briquette by impact, as distinguished from a formation under a relatively slow application of pressure, is advantageous and is necessary in order effectively to break down the cell structure of the particles of material with the result of the elimination of the pores in the material and the reducing of waste pore volume, of the subsequently formed carbon.

Two advantages result from charring the briquettes in the pressure of their distilled gases; one is that the briquettes retain a greater proportion of tars and hydrocarbons, thus yielding more char than would otherwise be obtained. The other advantage resides in the breakdown of the tar molecules during calcination and the accompanying escape of gases which make more infinitely small pores and spaces throughout the granules than would otherwise be the case. During the calcining to 2100° F. this considerable quantity of hydrocarbon substance tends to decompose. The resultant products are largely carbon and light hydrocarbon gases. The net result of first causing a heavy impregnation of the char with hydrocarbons and then the decomposition of said hydrocarbons by a high temperature treatment, is to produce a primary carbon which attains a high activity with only a small weight loss during steam activation.

High preliminary calcining temperatures tend to produce decomposition of hydrocarbons with elimination of hydrogen and very light hydrocarbons. This high calcining temperature produces the same result as that which Chaney described in U. S. Patent No. 1,499,908 with chlorin. That is, extreme activation is gained by small weight loss during steam activation.

The importance of eliminating most of the hydrogen content from primary carbon resides in the fact that a high activity may be obtained with less weight loss during activation than would be possible if the hydrogen content were high. Methods have heretofore been described teaching use of phosphoric acid, U. S. Patent to Urbain No. 1,735,096; phosphorous vapor, U. S. Patent No. 1,778,343; or chlorin, U. S. Patent No. 1,499,908 to Chaney to rid primary carbon of hydrogen. We wish to point out that the present method achieves practically the same result simply by the use of heat (2100° F.) alone.

Experimentation has disclosed a peculiar fact which is as follows: A primary carbon of maximum quality, both as to hardness and adsorption after activation, is obtained when compressed Douglas fir briquette char is gradually calcined, as described, up to a temperature of 2100° F. or 1149° C. This quality is maintained when the calcining is continued to 2200° F., but if the temperature is allowed to rise to 2600° F., the adsorptive quality of the product is materially impaired. It has been discovered that the hardness of the carbon is increased several hundred per cent and the adsorption nearly doubled, as compared to the calcining treatment described in Chaney U. S. Patent No. 1,497,544 at 800° C., when a calcining treatment as taught by this application is used.

One of the important discoveries embodied in this new method of making primary carbon is that carbon derived from wood briquettes may be given a hardness equal to or greater than that of cocoanut shell carbon. Our novel calcining treatment is of great importance in the achieving of this result.

In the past, it has been considered harmful to retain carbon at high temperature for a considerable period of time except where some dehydrogenating agent is present with the carbon, such as phosphoric acid, as noted in U. S. Patent No. 1,819,165 issued to Hass and U. S. Patent No. 1,735,096 issued to Urbain. We find that where our calcining schedule, calling for a temperature of 2100° F., is used, there is a very decided decrease in the hydrogen content of the carbon. Apparently the breakdown of hydrocarbon molecules throughout the carbon granule releases hydrogen and hydrogen containing gases. It would seem that the formation of an interlacing of molecularly dimensioned interstices throughout the granule is a result of the above mentioned molecular decomposition together with the escape of the gases formed thereby. We find the above treatment to be just the reverse of harmful, since it makes briquetted Douglas fir carbon almost twice as active as when given the calcining process described by Chaney in U. S. Patent No. 1,497,543. Comparative results are shown in the graph of Fig. 1, wherein the curve $a$ indicates results by our method and curve $c$ on the same kind of char indicates results obtained by the Chaney calcining treatment followed by the same steam activation as that given the material of curve $a$. This increase in adsorptive capacity as shown in curve $a$ is very desirable, but more important even than this is the fact that the material of curve $a$ is four times as hard as that of curve $c$ when each sample has a forty-five minute service time in the standard chloropicrin test. We desire hardness in our product, especially in order that it will not turn to dust in a gas mask cannister either through vibration due to shipping or by reason of jolts and jars received when the gas mask is carried by a man on foot. Our calcining treatment increases hardness in carbon so greatly that we particularly desire to stress this step in the present method of making primary carbon.

In the present method, our investigations have disclosed the fact that there are at least 14 variable factors which enter into the production of granulated primary carbon of maximum quality. These are: 1. Kind of starting material; 2. Moisture content of material; 3. Degree of comminution of material; 4. Method of briquetting; 5. Briquetting pressure; 6. Charring temperature; 7. Charring mechanical pressure; 8. Gaseous pressure during charring; 9. Time char is in retort; 10. Granulation of char; 11. Calcining temperature; 12. Rate of cooling calcined carbon; 13. Rate of attaining calcining temperature; 14. Kind of porosity in the carbon; that is, whether large, useless gross pores, or pores of less than microscopic dimension which will store adsorbed vapor in liquid form. After a very lengthy investigation, we are herewith presenting a method in which all of these variable factors are fixed at a point which gives an excellent primary carbon even though the starting material be a very soft wood.

While, in the foregoing specification, we have described particularly a method as applied to the preparation of a primary carbon from comminuted wood briquettes, it is not intended that the method or the claims shall be confined strictly to primary carbon from wood products, but that the method or portions thereof apply equally to various other carbonaceous materials; for example, wheat straw, corn stalks, marsh reeds, cocoanut shells and certain coals, particularly anthracite, whether briquetted or not.

Certain of the steps in this method have been shown to be especially advantageous in the treatment of cocoanut shell, as indicated in curves B and $b$ of the graph in Fig. 1. Therefore, the use of the term "carbonaceous materials" and equivalent terms, used in the claims, is intended to apply to cocoanut shells, coals, or other carbonaceous materials to the same extent as the comminuted wood material which has been particularly described.

Furthermore, in the claims, the use of the term "destructive distillation" or "the application of distilling heat," or equivalent terms, is intended to be considered as a heat or action which effects the charring of the product or briquette; the resultant product being referred to as "char," which consists of carbon, hydrocarbons and inorganic ash.

In this application, "primary carbon" may be defined as a material consisting of almost pure carbon with a low ash content, having considerable hardness and capable of attaining great adsorptive capacity for gases or vapors when activated.

Having thus described our invention, what we claim as new therein and desire to secure by Letters Patent is—

1. A method of preparing primary carbon from a carbon body comprising subjecting the body to a plurality of stepped up calcining temperatures, the final temperature being approximately 2100° F.; the material being subjected to each of the various temperatures until inflammable gas ceases to be evolved therefrom, and under the final temperature for a substantial period after inflammable gas ceases to be evolved then causing the calcined material to cool slowly through an extended period of time.

2. The method of preparing primary charred wood which comprises subjecting a carbon body to calcining heat and then causing the calcined material to cool slowly and gradually through an extended period of time.

3. The method of converting a wood body into primary carbon comprising subjecting the body to distilling heat until reduced to char, maintaining the body under mechanical compression and in a positive pressure of its distillate gases during the distilling period, calcining the charred body and finally effecting a controlled, slow cooling over an extended period of time.

4. The method of preparing primary carbon from comminuted wood which comprises compressing the comminuted material into solid briquettes, subjecting the briquettes to distilling heat until reduced to char while maintained in a positive pressure of the distillate gases, and under a compressing mechanical pressure during the distilling operation, and for a substantial period thereafter, reducing the briquettes to granules, calcining the granulated product, and then slowly cooling the product through an extended period of time.

WORTH C. GOSS.
OLIVER P. M. GOSS.